United States Patent [19]
Cok et al.

[11] Patent Number: 6,104,839
[45] Date of Patent: Aug. 15, 2000

[54] METHOD AND APPARATUS FOR CORRECTING PIXEL VALUES IN A DIGITAL IMAGE

[75] Inventors: David Roy Cok; Robert Terry Gray, both of Rochester; Tomasz Andrzej Matraszek, Pittsford, all of N.Y.

[73] Assignee: Eastman Kodak Company, Rochester, N.Y.

[21] Appl. No.: 08/675,320

[22] Filed: Jul. 10, 1996

[51] Int. Cl.[7] .............................. G06K 9/40; H04N 1/40
[52] U.S. Cl. .................. 382/254; 382/275; 382/205; 358/448; 358/463
[58] Field of Search ..................................... 382/254, 275, 382/190, 195, 205; 358/447, 448, 463

[56] References Cited

U.S. PATENT DOCUMENTS

| | | |
|---|---|---|
| 4,480,636 | 11/1984 | Karaki et al. . |
| 4,498,104 | 2/1985 | Shultz . |
| 4,894,721 | 1/1990 | Matsuda . |
| 4,910,694 | 3/1990 | Walther . |
| 4,941,186 | 7/1990 | Massmann et al. . |
| 5,008,739 | 4/1991 | D'Luna et al. . |
| 5,036,405 | 7/1991 | Kojima ..................................... 358/448 |
| 5,097,521 | 3/1992 | Massmann . |
| 5,214,470 | 5/1993 | Denber . |
| 5,303,051 | 4/1994 | Levesque et al. . |
| 5,327,246 | 7/1994 | Suzuki . |
| 5,365,604 | 11/1994 | Kwok et al. . |
| 5,623,558 | 4/1997 | Billawala et al. ....................... 382/254 |

FOREIGN PATENT DOCUMENTS

| | | | |
|---|---|---|---|
| 0 457 562 A1 | 11/1991 | European Pat. Off. | ........ G06F 15/68 |
| 0 624 848 A2 | 11/1994 | European Pat. Off. | ........ G06F 15/68 |
| 0 778 543 A2 | 6/1997 | European Pat. Off. | .......... G06T 5/20 |

OTHER PUBLICATIONS

EP Communication—European Search Report, dated May 29, 1998.

M. Nagao and T. Matsuyama, "Edge Preserving Smoothing", Computer Graphics and Image Processing 9, Academic Press, Inc., pp. 394–407 (1979).

W. Press, S. Teukosky, W. Vetterling, and B. Flannery, "Numerical Recipes In Fortran", Chapter 15, (2d ed., 1992), pp. 650–700.

*Primary Examiner*—Thomas D. Lee
*Attorney, Agent, or Firm*—Peyton C. Watkins

[57] ABSTRACT

A method and apparatus for editing continuous tone digital images representing pixels in which regions containing defects, called "defect regions", are unnoticeable or less visually discernible. Corrected pixel data for pixels in the defect region, called defect pixels, in the digital image are provided while data representing non-defect pixels outside of the defect region are not altered. These digital images may have one color channel (gray side) or multiple color channels. The apparatus and method includes a computer system which operates according to a set of instructions.

25 Claims, 9 Drawing Sheets

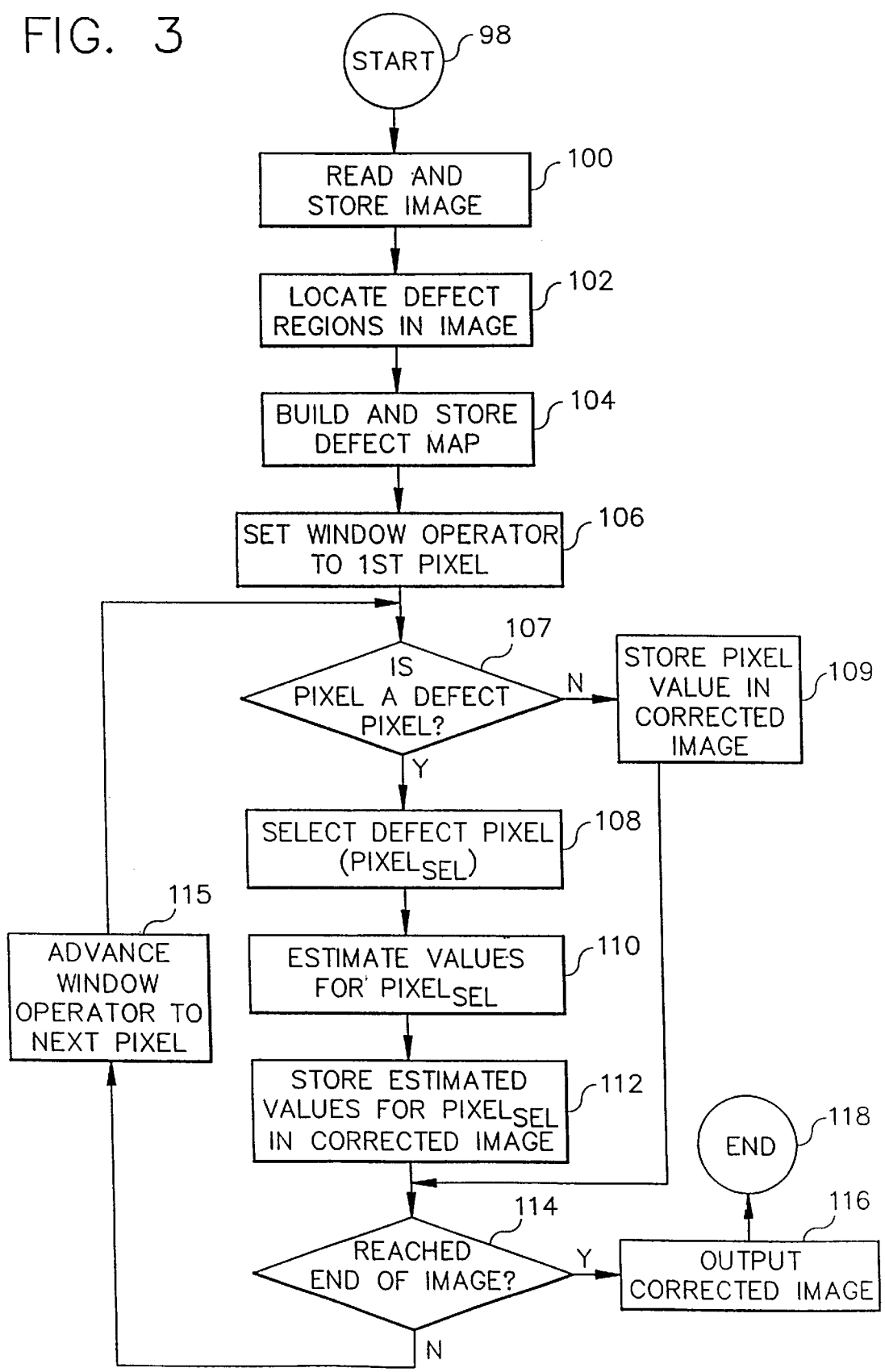

METHOD AND APPARATUS FOR CORRECTING PIXEL VALUES IN A DIGITAL IMAGE

FIELD OF THE INVENTION

This invention relates generally to improving the quality of digital images, and more particularly, relates to a method and apparatus for correcting long and narrow regions of defect pixels in a two-dimensional continuous tone digital image.

BACKGROUND OF THE INVENTION

A digital image is a two-dimensional array of pixel elements. Examples of two-dimensional pixel arrays for digital images are 768×512 pixels or 1024×1024 pixels. Each pixel of a digital image may be represented by digital values which provide the intensity and color of the image. A digital image may be composed of a single color channel (gray scale) or multiple color channels, such as RGB or YCC, where each pixel in the digital image has a value for each color channel of an image. Generally, these digital images are called continuous tone digital images.

Often, a digital image will have pixel regions with noisy or corrupted pixel values due to defects in the original digitized image or defects introduced into the image by the digitizing process. Pixels within such regions are referred to as defect pixels and pixels outside those regions are referred to as non-defect pixels.

Prior automatic image editing systems have had limited success in reconstructing these defect pixel regions. Typically, these systems attempt to reconstruct the regions by estimating values for each defect pixel using values from the closest non-defect pixel or by averaging the values from a number of the closest non-defect pixels. Although this reconstruction is adequate in small compact defect regions of only a few pixels in size, it fails to provide proper reconstruction of larger (e.g., long and narrow) defect regions. This results in reconstructed defect regions which are often visually inconsistent with the non-defect pixels in the image. One reason for this inconsistency is that the selection of non-defect pixels used in estimating values of defect pixels may be improper, which causes blurring of the reconstructed image in the defect region. Another reason for this inconsistency may be the result of improper reconstruction of edges of objects in the image which intersect the defect regions. This results in reconstructed edges appearing bent or discontinuous.

PROBLEM TO BE SOLVED BY THE INVENTION

A problem to be solved by the invention is to reconstruct defect regions which are visually consistent with the non-defect pixels in the image.

SUMMARY OF THE INVENTION

An apparatus and method in accordance with the present invention includes a programmed computer system which operates on a set of instructions for correcting defect pixels in a digital image, and which is coupled to an image reader, an image output device, and a user interface. The method set forth in the set of instructions includes the steps of: selecting one of the defect pixels in the defect region; allocating a plurality of line segments through the selected defect pixel, wherein each line segment is composed of pixels in the source image about the selected defect pixel; determining at least one representative model of the non-defect pixel values in each line segment; determining the deviation of the non-defect pixel values in each line segment from their models; selecting the line segment having the lowest deviation; and determining corrected pixel values for the selected defect pixel based on the values of at least two non-defect pixels in the selected line segment.

An apparatus and method in accordance with another embodiment of the invention includes the steps of: selecting one of the defect pixels in the defect region; allocating a plurality of line segments through the selected defect pixel, wherein each line segment is composed of pixels in the source image about the selected defect pixel; determining at least one representative model of the non-defect pixel values in each line segment; determining the deviation of the non-defect pixel values in each line segment from their model; determining first estimated pixel values for the selected defect pixel for each line segment based on the values of at least two non-defect pixels in each line segment; and determining second values of the selected defect pixel based on the first pixel values, where the first pixel values contribute to the second pixel value relative to the deviations of each line segment. The second values of the selected defect pixel represent its corrected values. The above embodiments may also include the steps of scanning successively each pixel in the source image, selecting the defect pixel while the source image is being scanned, and generating a corrected image having the non-defect pixels of the source image, and the corrected values for each defect pixel.

ADVANTAGEOUS EFFECT OF THE INVENTION

The advantage of the apparatus and method of the present invention is that the estimated defect pixel values in the reconstructed defect region of the source image are visually more consistent in color with the non-defect pixels in the image than in prior automatic image editing systems. This is particularly true for defect regions which are long and narrow. This ultimately results in a corrected image having superior quality in the reconstructed defect regions, which are either unnoticeable or visually less discernible to the human eye.

BRIEF DESCRIPTION OF THE DRAWINGS

FIG. 3 is a flow chart illustrating a method for correcting defect pixels in a digital image in accordance with the present invention;

DETAILED DESCRIPTION OF THE INVENTION

Figure 1:
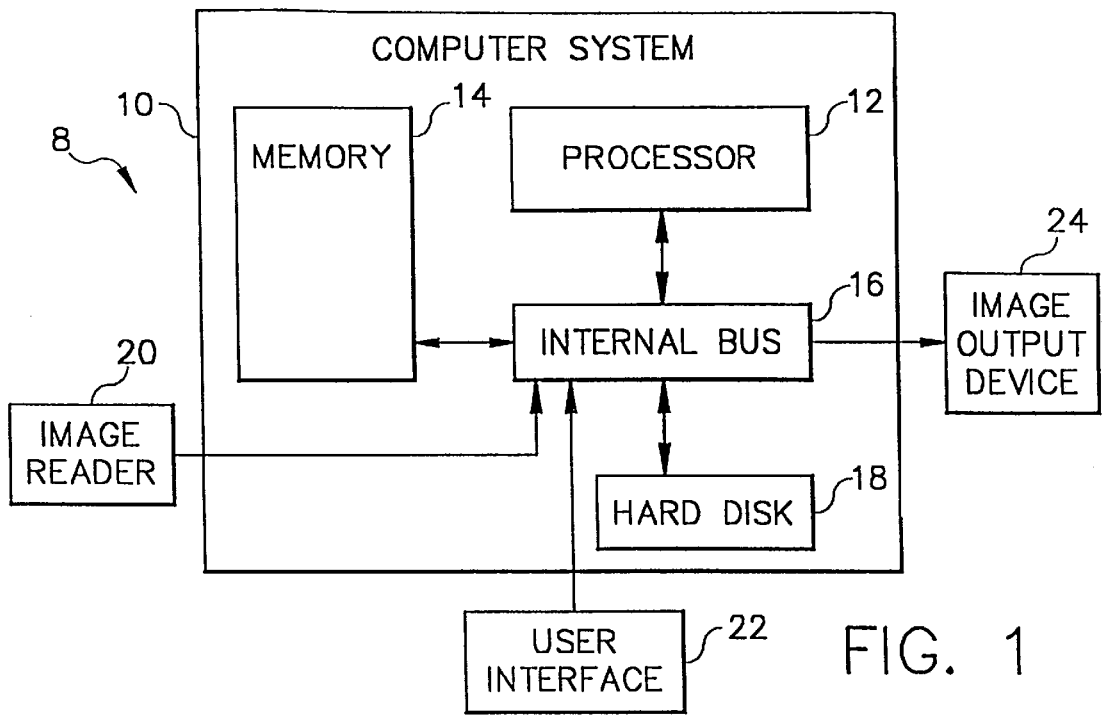
FIG. 1 is a block diagram of an apparatus for correcting values of defect pixels in a digital image in accordance with the present invention.

An apparatus 8 in accordance with the present invention includes a programmed computer system 10 coupled to an image reader 20, an image output device 24, and a user interface 22. Computer system 10 operates. according to a set of instructions to correct digital images by correcting values of defect pixels within a defect region in the digital images. With the apparatus and method, defect regions in digital images can be corrected so that regions are entirely unnoticeable to a viewer or less visually discernible because values for defect pixels have been estimated which are consistent with the overall image.

Referring more specifically to FIG. 1, computer system 10 includes a processor 12, memory 14 and a hard disk 18, which are coupled together with an internal bus 16 for communicating both data and addresses between these components. Preferably, digital images are stored on hard disk 18 in system 10.

Image reader 20 is coupled to computer system 10, and provides a digital image to the computer system 10 via internal bus 16. This digital image is stored in memory 14. In this particular embodiment, image reader 20 is a digital scanner or digital camera, such as Kodak Professional Photo-CD 4045 Film Scanner, although any type of device for providing a digital image may be used. Computer system 10 may also receive digital images from other sources, such as digital images stored in hard disk 18. Each digital image is composed of an array of pixel values having one or more color channels.

Image output device 24 is coupled to computer system 10. In this particular embodiment, output device 24 may be any type of digital image output device, such as a video display, a printer, an external non-volatile memory storage device, or a transmission line to other computers within a network. Images stored in memory 14 may be output to image output device 24 through internal bus 16.

User interface 22, such as a keyboard or mouse device, is coupled to computer system 10 and allows for a user to control and interact with apparatus 8, such as building of a defect map of the digital image stored in memory 14. User inputs through user interface 22 are. described later.

Referring to FIGS. 2(a–d) and 3, the operation of apparatus 8 will be discussed. When computer system 10 is started at step 98, system 10 receives a digital image from image reader 20 and stores the image in memory 14 (step 100). Alternatively, this image may have already been stored in memory 14. The image stored in memory 14 will hereinafter be referred to as the "source image." An example of the source image 25 is shown in FIG. 2(a) with defect region 26. The source image may be comprised of a single color channel (monochrome), or have multiple color channels, such as RGB.

Once the source image is stored in memory 14, then in step 102 the defect regions in the source image are located. Preferably, this is performed by the user identifying the approximate image areas containing the defect regions through user interface 22, and then processor 12 automatically detecting the defect pixels in those areas identified by the user. A identification system automatically identifies small local regions of an image which are anomalous in both brightness/color, local contrast, and size, and outputs a map of the defect pixels in the image. Alternatively, the defect pixels may be selected manually by the user, which can be performed by a user generating a digital mask via user interface 22 (e.g., by a graphic "painting" software application) identifying the defect pixels.

Figure 2A:
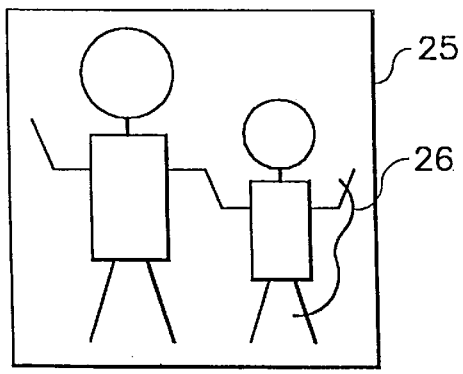
FIG. 2(a) is a pictorial view of a digital image with a defect pixel region.
Figure 2B:
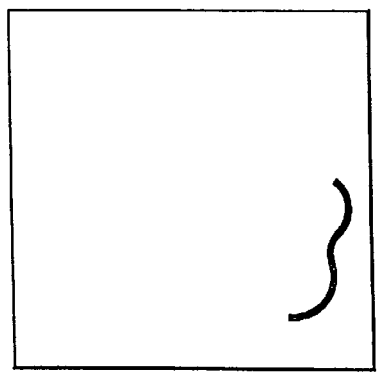
FIG. 2(b) is a pictorial view of a defect map for the digital image in FIG. 2(a)

Once the defect regions are located, a defect map is built and stored in memory 14 (step 104). In the defect map, pixels with a specified value correspond to defect pixels in the source image. One example of a defect map is shown in FIG. 2(b) for the defect region 26 of the source image 25 in FIG. 2(a). In this example, defect pixels are represented by bits set to zero (black), and non-defect pixels are represented by bits set to one (white).

Figure 2C:
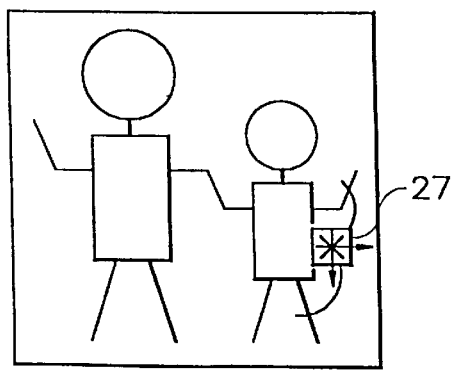
FIG. 2(c) is a pictorial view of the window operator used during correction of defect pixels in the digital image in FIG. 2(a)

Next, a window operator is set, preferably centered, on a first pixel in the source image (step 106). An example of the window operator 27 in operation is shown in FIG. 2(c). In computer system 10, the window operator is used in performing correction of defect pixel values in the source image. The window operator defines a region of interest in the source image about a pixel centered within the region. In the preferred embodiment, the shape and size of this window operator is a square region, where each side or boundary of the square region is X in size. However in another embodiment, the window operator may be a circular region having a diameter X. This window operator is used by processor 12 to scan across each pixel in the lines of the source image. The scanning pattern of the window operator is not critical as long as all defect pixels are visited during scanning. For example, a raster-scan pattern may be used.

In step 107, a check is made to determine whether this pixel set within the window operator is a defect pixel by referencing the defect map stored in memory 14. If the pixel is a non-defect pixel, then in step 109 the values of this non-defect pixel are stored in an area of memory 14 which is allocated for storing the corrected source image ("corrected image"). If the pixel is a defect pixel, then the defect pixel is selected ("$PIXEL_{SEL}$") for subsequent correction (step 108). Next, a corrected value in each channel of $PIXEL_{SEL}$ is estimated (step 110). FIG. 2(c) shows an illustration of window operator 27 and the estimation of corrected values for a defect pixel in the defect region 26 of the source image 25. The process for estimating corrected values is described in greater detail in FIGS. 4A and 4B.

Figure 4A:
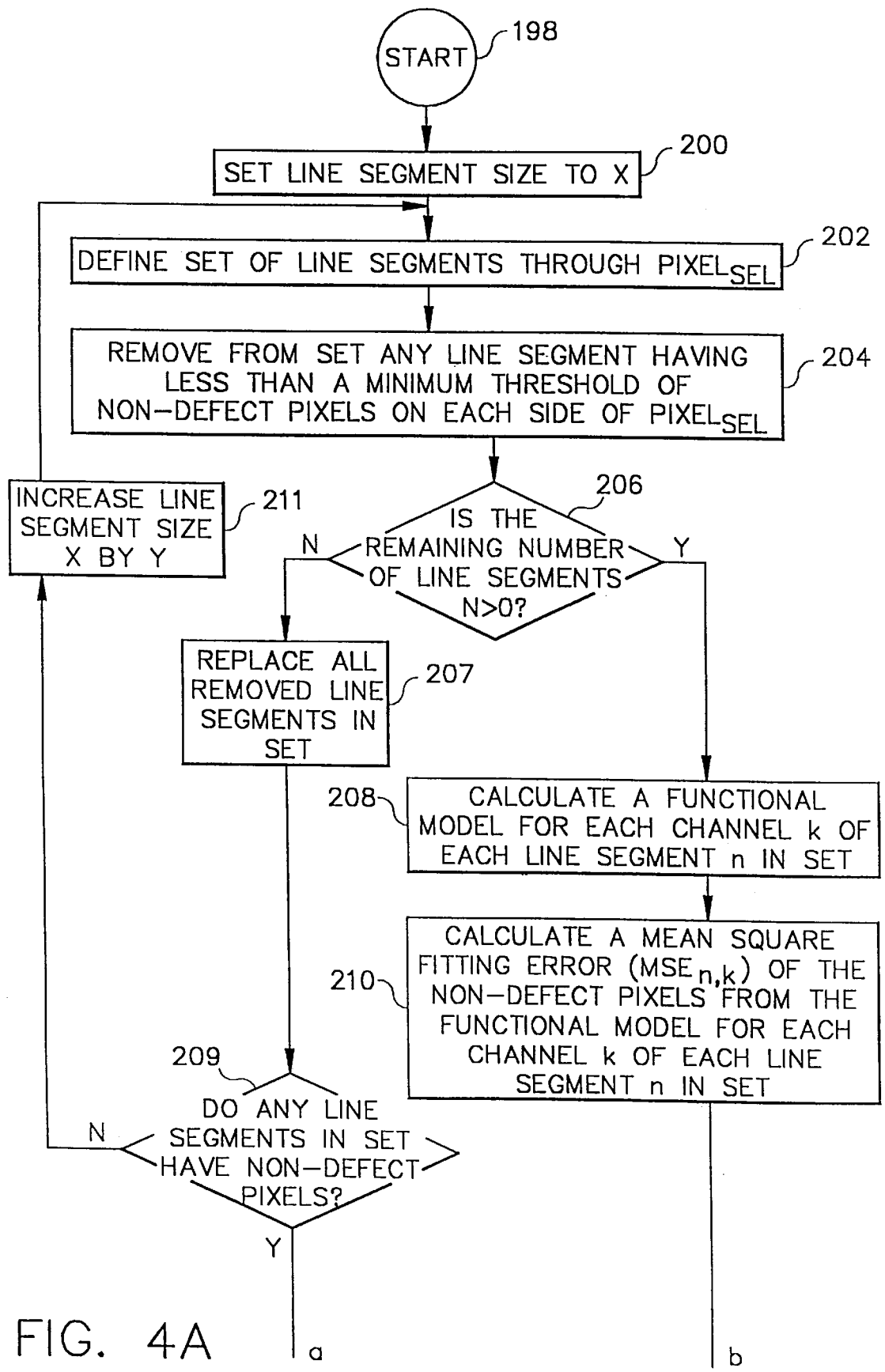
FIGS. 4A and 4B are flow charts illustrating a process for estimating corrected values for a defect pixel.
Figure 4B:
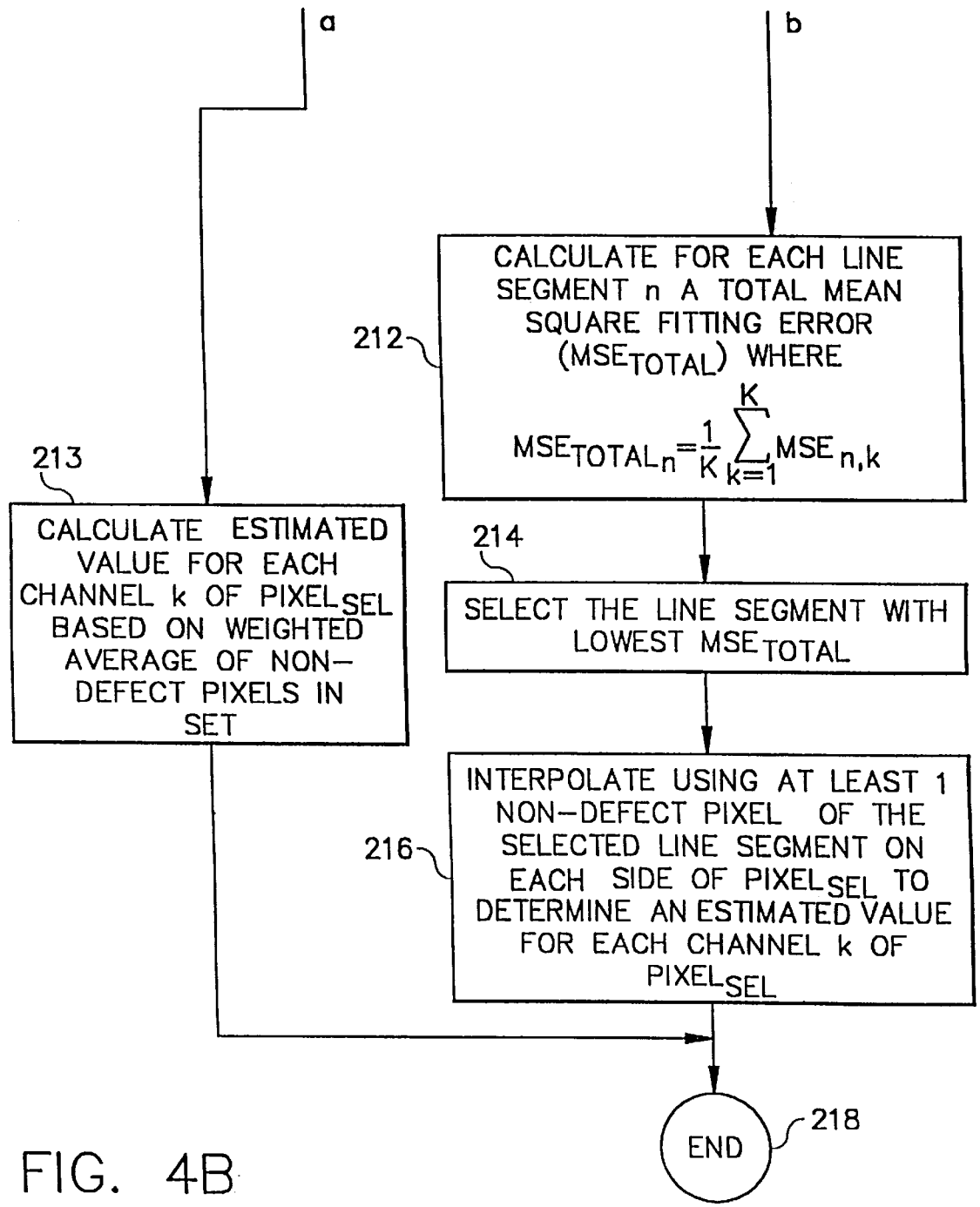

Referring to FIGS. 4A and 4B, the process for estimating corrected values for $PIXEL_{SEL}$ is started at step 198. The line segment size is set to X for every direction (step 200). Preferably, X is at least twice the maximum width of the defect region in the source image. A SET of line segments or vectors is defined or allocated through $PIXEL_{SEL}$ wherein each line segment is composed of both defect and non-defect pixels in the source image on one or both sides of $PIXEL_{SEL}$ (step 202). In this embodiment, the total number of defect pixels and non-defect pixel in each line segment is maintained the same, which corresponds to the square window operator. Alternatively, each line segment can have the same length X defined as the Euclidean distance, which corresponds to the circular window operator. However, in other embodiments the total number of pixels in each line segment may vary depending on the defect pixel and line segment, as will be described later.

SET is composed of N number of line segments, where each line segment is represented by the following notation: In SET, n refers to each line segment (n=1 to N). Each line segment n has pixels having values for K number of color channels. The nth line segment is referred to as $LS_n$. The kth channel of the nth line segment in SET is referred to as $LS_{n,k}$. For example, where SET has 4 line segments (N=4), and each pixel has 3 channel values (K=3), the 2nd channel of the 3rd line segment in SET is $LS_{3,2}$.

Preferably, the line segments are each at equal radial angles at 45° or 22.5° intervals with respect to each other about $PIXEL_{SEL}$, although the angles can vary as needed. The number of line segments in SET depends on the size of this angle. For example, radial angles at 45° intervals provide 4 line segments in SET, while radial angles at 22.5° intervals provides 8 line segments in SET. Preferably, each line segment is composed of pixels which are less than 0.5 pixel distance away from a line through $PIXEL_{SEL}$ at the radial angle associated with each respective line segment.

Figure 8:
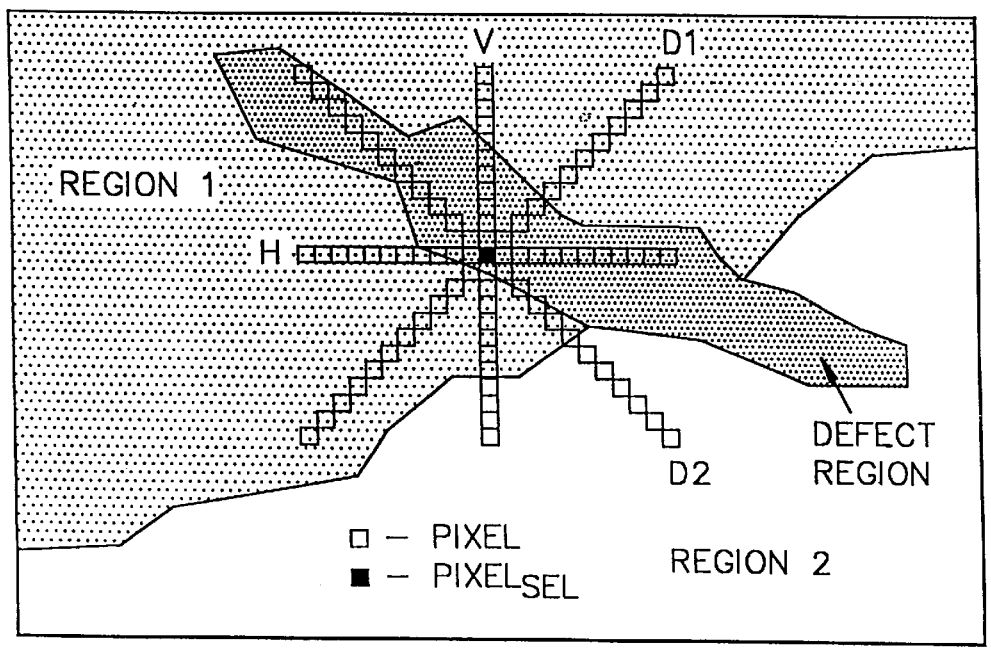
FIG. 8 is a pictorial view of an example illustrating line segments defined about a defect pixel.

Referring to FIG. 8, an example of a SET of 4 line segments (H, V, D1, and D2) is shown at 45° spacing to each other, where each line segment is composed of a total of 22 pixels and has 11 pixels on each side of $PIXEL_{SEL}$.

Referring back to FIGS. 4A and 4B, once the SET of line segments is defined, then at step 204 any line segments which do not contain a minimum threshold number of non-defect pixels on each side of $PIXEL_{SEL}$ are considered not valid line segments, and are removed from SET. Preferably, the minimum threshold is set to one-half the number of pixels on one side of a line segment. For example, if each line segment has 8 pixels, then 4 pixels are on each side of $PIXEL_{SEL}$ and the minimum threshold is 2 pixels. Accordingly, any line segment which does not have at least 2 non-defect pixels on each side of $PIXEL_{sel}$ is removed from SET.

Next, a check is then performed to determine whether the remaining number of line segments N in SET is greater than zero (step 206). If N is not greater than zero, then the "no" branch is taken to step 207 where all the line segments previously removed are replaced in SET. Once the line segments are replaced, a query is made to determine whether any of the line segments have non-defect pixels (step 209). If there are no non-defect pixels in the line segments of SET, then the "no" branch is taken to step 211 where the line segment size X is increased by Y. This accordingly expands the window operator region by Y, thereby increasing the possibility that when SET is redefined line segments will include non-defect pixels. A new SET of line segments is redefined through $PIXEL_{SEL}$ at this increased line segment size at step 202, and the process as described above is repeated. If the line segments at step 209 contain any non-defect pixels, then the "yes" branch is taken to step 213 where an estimated value for each channel k of $PIXEL_{SEL}$ is calculated based on the weighted average of the non-defect pixels in SET. These weights are determined by their respective distances from $PIXEL_{SEL}$.

The calculation for estimating values for each channel k of $PIXEL_{SEL}$ at step 213 preferably is as follows:

$$PIXEL_{SEL_k} = \frac{\sum_{i=1}^{Q} W_i P_{i,k}}{\sum_{i=1}^{Q} W_i} \quad (1)$$

where:

i=index for each non-defect pixel in SET;

Q=total number of non-defect pixels in SET;

$P_{i,k}$=the value of the $k^{th}$ channel of the $i^{th}$ non-defect pixel in SET; and $W_i$=the weight for the $i^{th}$ non-defect pixel in SET, where $$W_i=((x_i-x_{SEL})^2+(y_i-y_{SEL})^2)^{1/2} \quad (2)$$

$x_i$ and $y_i$=the x and y coordinates of the $i^{th}$ non-defect pixel in SET in the source image, and $x_{SEL}$ and $y_{SEL}$=the x and y coordinates of $PIXEL_{SEL}$ in the source image Once the estimation of values for $PIXEL_{SEL}$ is completed (step 218) processing then goes to step 112 in FIG. 3.

If at step 206 the number of line segments N is greater than zero, then the "yes" branch is taken to step 208 where a functional model is calculated for the non-defect pixel values for each channel k of each line segment in SET. The functional model calculation is performed by fitting the values of the non-defect pixels in a line segment to a mathematical model, such as a flat field fit, linear fit, or quadratic fit. This fitting is based on the values of the non-defect pixels, and the distances between them. A variety of techniques may be used for modeling the non-defect pixel values, and the particular technique chosen will affect model accuracy, and require a different minimum number of non-defect pixels. One example of this technique is shown in W. PRESS, S. TEUKOLSKY, W. VETTERLING, AND B. FLANNERY, NUMERICAL RECIPES IN FORTRAN, Ch. 15 (2d ed., 1992), which is herein incorporated by reference. In the preferred embodiment, the functional model calculation at step 208 uses a linear least-squares fit, which requires at least one non-defect pixel lying on each side of $PIXEL_{SEL}$. Earlier performed step 204 may be used to assure that this minimum is met for all line segments in SET.

Next at step 210, a mean square fitting error (MSE) is calculated of the non-defect pixel values from the functional model for each channel of each line segment in SET. The MSE calculation is a statistical measure of the deviation of the non-defect pixel values in a line segment from an estimate of their values based on their functional fit. Thus, the lower a MSE value the more consistent to the model are the non-defect pixel values. For a given channel and line segment, MSE is calculated by determining the difference between the value of each non-defect pixel from its value estimated along the functional model. The resulting difference for each non-defect pixel is then squared, and the sum of these squares is averaged to obtain the MSE. (In the case of a flat field fit for the functional model calculation, the MSE is equivalent to the variance of the non-defect pixels in the line segment.) Mean square fitting error of the $k^{th}$ channel of the $n^{th}$ line segment ($MSE_{n,k}$) is calculated by:

$$MSE_{n,k} = \frac{1}{M_n} \sum_{i=1}^{M_n} (P_{i,n,k} - p_{i,n,k})^2 \qquad (3)$$

where:
  $M_n$=number of non-defect pixels in $LS_n$;
  i=index for each non-defect pixel in $LS_n$ from 1 to Mn;
  $P_{i,n,k}$=the actual value of the $i^{th}$ non-defect pixel in channel k in $LS_n$; and
  $P_{i,n,k}$=the functional model estimate value of the $i^{th}$ non-defect pixel in channel k in $LS_n$.

Then at step 212, a calculation is performed for each line segment wherein each channel of the line segment is combined to provide a total mean square fitting error value ($MSE_{Total_n}$), where:

$$MSE_{Total_n} = \frac{1}{K} \sum_{k=1}^{K} MSE_{n,k} \qquad (4)$$

K=the total number of channels (for RGB, K=3); and
  k=index for each channel from 1 to K.

The line segment having the lowest $MSE_{Total}$ is then selected (step 214). The selected line segment represents the preferred line segment for determining estimated values for $PIXEL_{SEL}$. An estimated value for each channel k of $PIXEL_{SEL}$ is then interpolated using at least one non-defect pixel of the selected line segment on each side of $PIXEL_{SEL}$ (step 216). In this manner, by selecting the line segment with the lowest total mean square fitting error, the line segment representing non-defect pixels which are most consistent to their functional model across all channels is used in determining the estimated values for $PIXEL_{SEL}$. Once the estimation of values for $PIXEL_{SEL}$ is completed (step 218) then processing goes to step 112 in FIG. 3.

Referring to FIG. 8, an example of the processing in FIGS. 4A and 4B is described below. FIG. 8 shows an expanded view of a source image with a defect region extending from Region 1 to Region 2, wherein each region is composed of pixels with similar pixel values, which are distinct between regions. There are 4 line segments in SET labeled H, V, D1 and D2, which are defined through $PIXEL_{SEL}$ at the center or intersection of the line segments (step 202). Once defined, line segment H and D2 are removed from SET because each has a side without any non-defect pixels, and therefore is below a minimum threshold of 4 non-defect pixels (step 204). Next, a functional model is fitted and a mean square fitting error is calculated for remaining line segments V and D1 (steps 208–210). In the single color channel (K=1) example of FIG. 8, the mean square fitting error for line segment D1 is lower than the mean square fitting error for line segment V. This is due to the excessive fitting error for dissimilar non-defect pixel values along line segment V extending through Region 1 and Region 2. In contrast, the non-defect pixels of line segment D1 all lie within Region 1 and have uniform pixel values. Thus line segment D1 has a lower fitting error than line segment V. Consequently, at step 214 line segment D1 is selected, and at step 216 $PIXEL_{SEL}$ is replaced with an estimate value based upon the non-defect pixels in line segment D1.

Figure 5A:
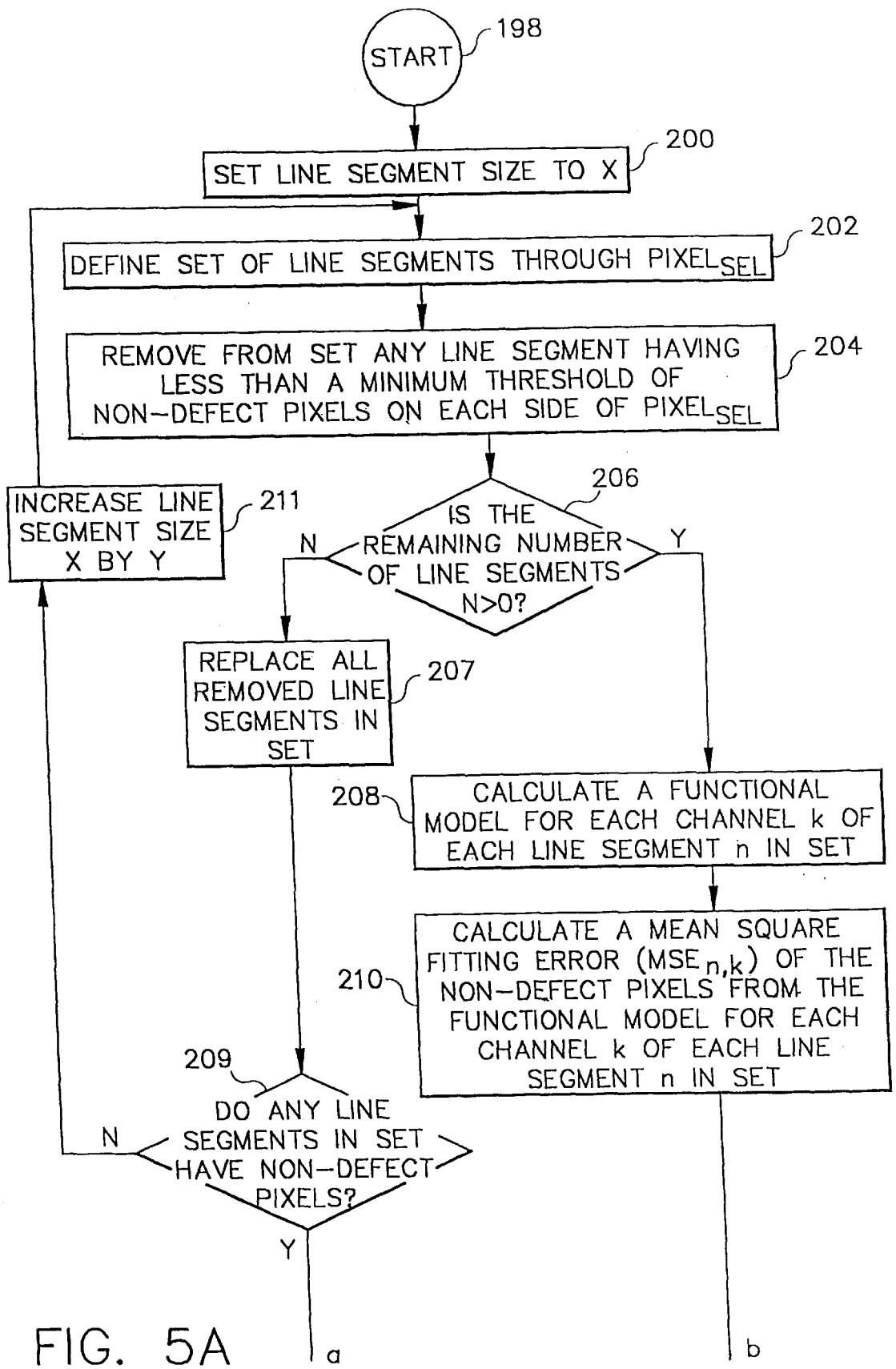
FIGS. 5A and 5B are flow charts of another embodiment illustrating a process for estimating corrected values for a defect pixel.
Figure 5B:
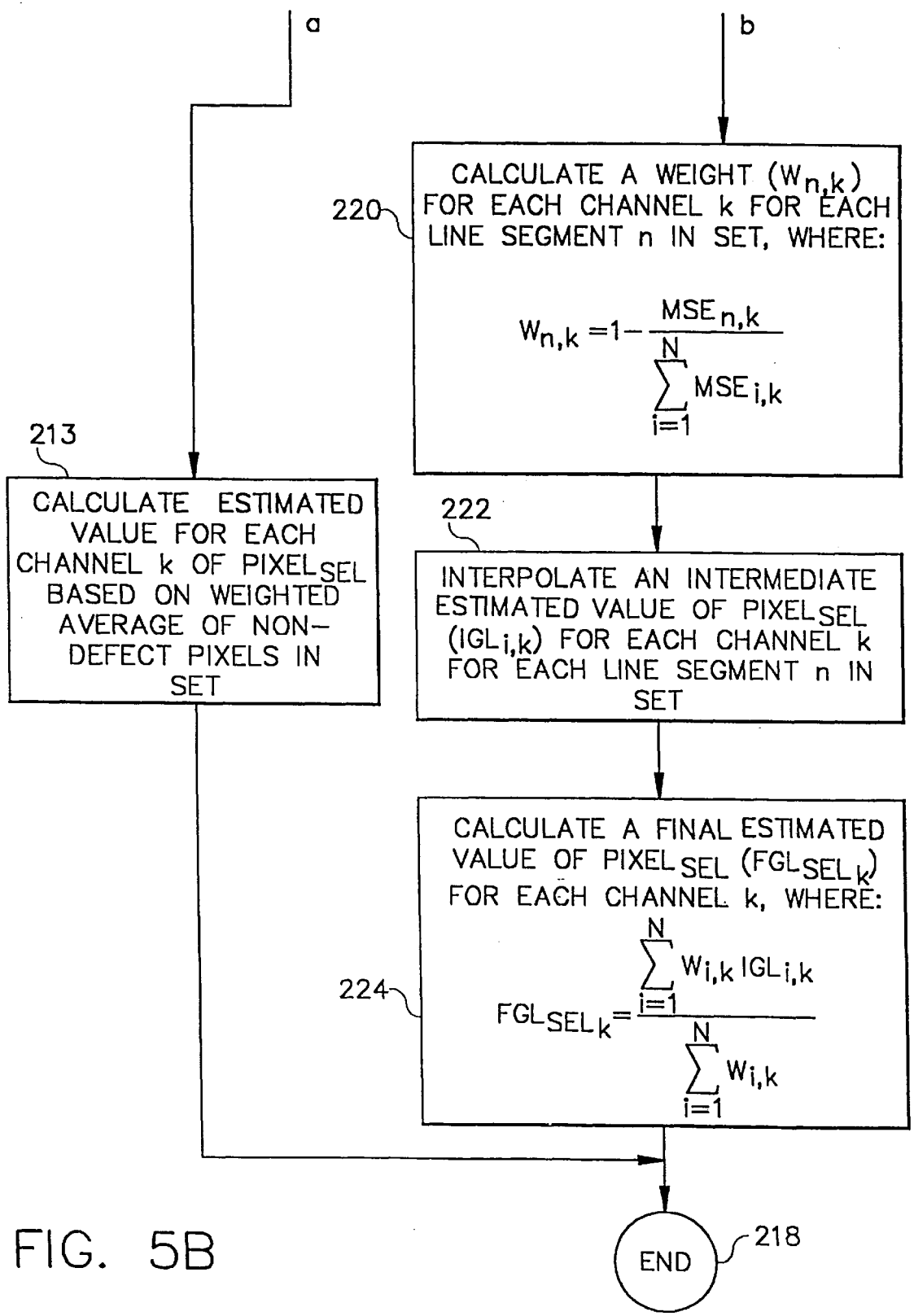

Referring to FIGS. 5A and 5B, an alternative embodiment for estimating corrected values for $PIXEL_{SEL}$ is illustrated. Corresponding steps in FIGS. 5A and 5B have numeral designations which correspond to those in FIGS. 4A and 4B and will not be described again. Accordingly, once the mean square error calculations are made at step 210, then a weight ($w_{n,k}$) is calculated at step 220 for each channel k for each line segment n in SET, where:

$$w_{n,k} = 1 - \frac{MSE_{n,k}}{\sum\limits_{i=1}^{N} MSE_{i,k}} \qquad (5)$$

As shown by the equation (5), the lower the mean square fitting error for a given line segment in a given channel, the greater will be the calculated weight. Next, an intermediate estimated value of $PIXEL_{SEL}$ ($IGL_{i,k}$) is interpolated for each channel k for each line segment in SET (step 222). Once the interpolated process is completed, a final estimate value of $PIXEL_{SEL}$ ($FGL_{SEL_k}$) is calculated for each channel k (step 224), where:

$$FGL_{SEL_k} = \frac{\sum\limits_{i=1}^{N} w_{i,k} IGL_{i,k}}{\sum\limits_{i=1}^{N} w_{i,k}} \qquad (6)$$

Thus, the final estimate value of $PIXEL_{SEL}$ is based upon a contribution of each of the calculated intermediate estimate values for each channel of each line segment relative to their respective weights. To illustrate this, if for example the line segments are those shown in FIG. 8, then intermediate estimate values for $PIXEL_{SEL}$ are calculated for line segments V and D1 because all other line segments were removed at step 204. But, since line segment D1 has a lower mean square fitting error than line segment V, the intermediate estimate value for line segment D1 contributes significantly more to the final estimate value of $PIXEL_{SEL}$ than the intermediate estimate value for line segment. V. Once the estimation of values for $PIXEL_{SEL}$ is completed (step 216) then processing goes to step 112 in FIG. 3.

Referring back to FIG. 3, once estimated values for $PIXEL_{SEL}$ are calculated, then at step 112 they are stored in the corrected image area of memory 14. A check is then made at step 114 to determine whether the end of the source image has been reached. In other words, have all pixels in the source image been scanned by the window operator. If not, then the "no" branch is taken to step 115 where the window operator is advanced, and set, preferably centered, to the next pixel in the image and steps 107–114 are repeated as previously described.

Figure 2D:
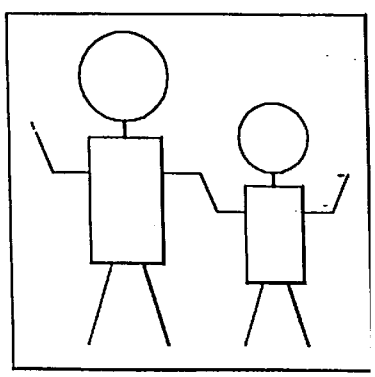
FIG. 2(d) is a pictorial view of a corrected digital image after correction of the defect pixels in the digital image in FIG. 2(a)

Once the end of image is reached, the "yes" branch is taken from step 114 to step 116, where the corrected image stored in memory 14 is output to the image output device 24 at step 116 and the end of the process at step 118. An example of the corrected image is shown in FIG. 2(d), wherein the defect 26 has been corrected and is no longer visually discernible.

In two alternative embodiments, the size of each line segment at step 202 in FIGS. 4A, 4B and 5A, 5B is variable along its respective radial line through $PIXEL_{SEL}$. Thus, step 200 for setting the line segment size is no longer needed. Line segments are extended on both sides of $PIXEL_{SEL}$. The composition of each line segment is determined by extending each line segment along a vector (i.e., its respective radial line) from each side of $PIXEL_{SEL}$ as described below.

In the first alternative embodiment, line segments are separately extended on each opposite side of $PIXEL_{SEL}$ on a vector along its respective radial line until each side is composed of a certain number of non-defect pixels, ND, (not shown or described with respect to FIGS. 4A, 4B and 5A, 5B). Preferably, ND represents two or three non-defect pixels. If a line segment cannot be extended on either side of $PIXEL_{SEL}$ to include ND non-defect pixels, then that line segment is not included in SET. This can occur because the line segment extension reached the outer edge of the source image (or defect map) or a maximum distance from $PIXEL_{SEL}$ without locating ND non-defect pixels. Once both sides of any line segment include ND non-defect pixels, it is assured that the line segment has a proper number of non-defect pixels for subsequent processing.

Figure 6A:
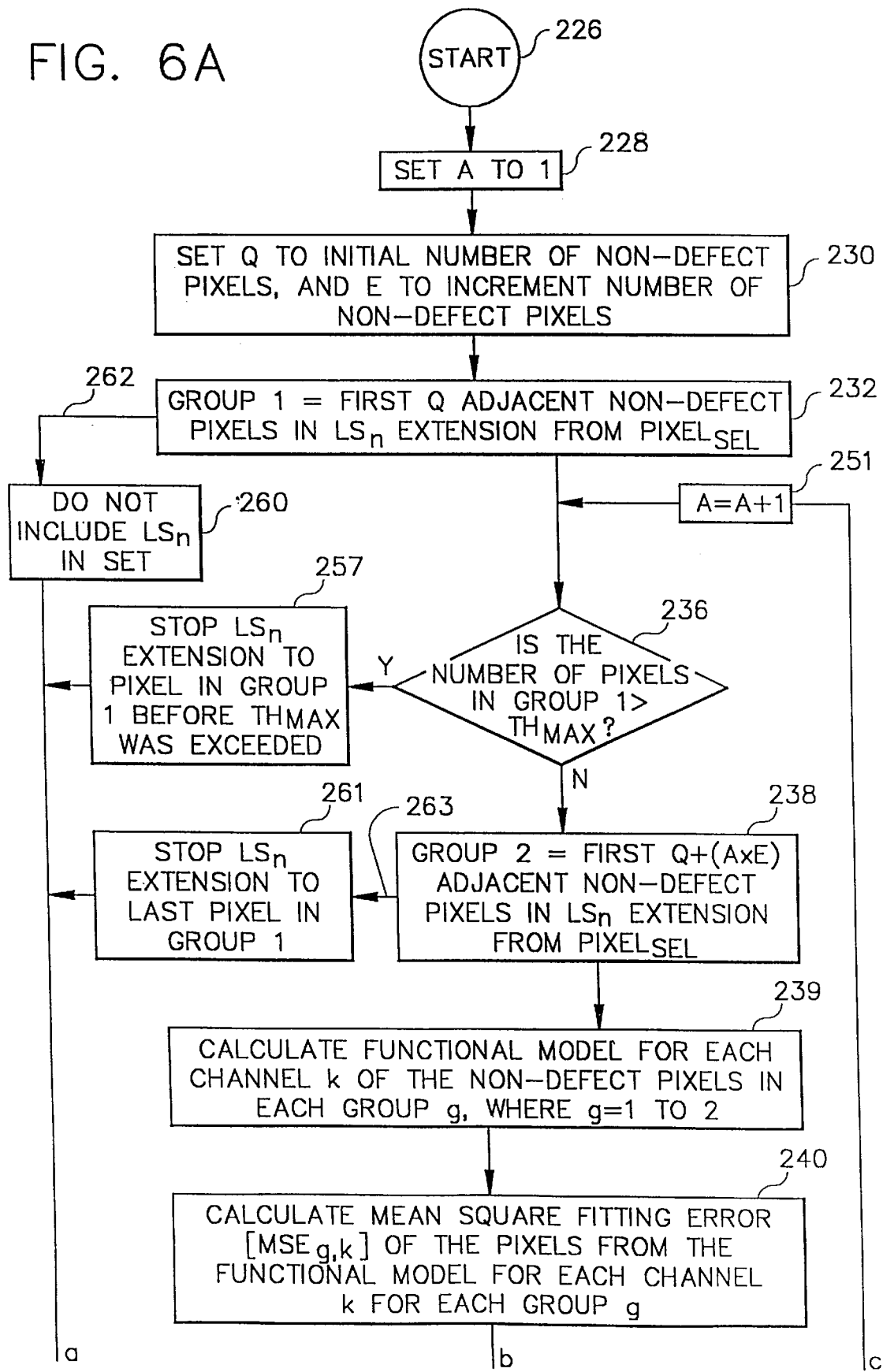
FIGS. 6A and 6B are flow charts illustrating an alternative embodiment for defining the line segments in the process for estimating corrected values for a defect pixel in FIGS. 4A, 4B and 5A, 5B.
Figure 6B:
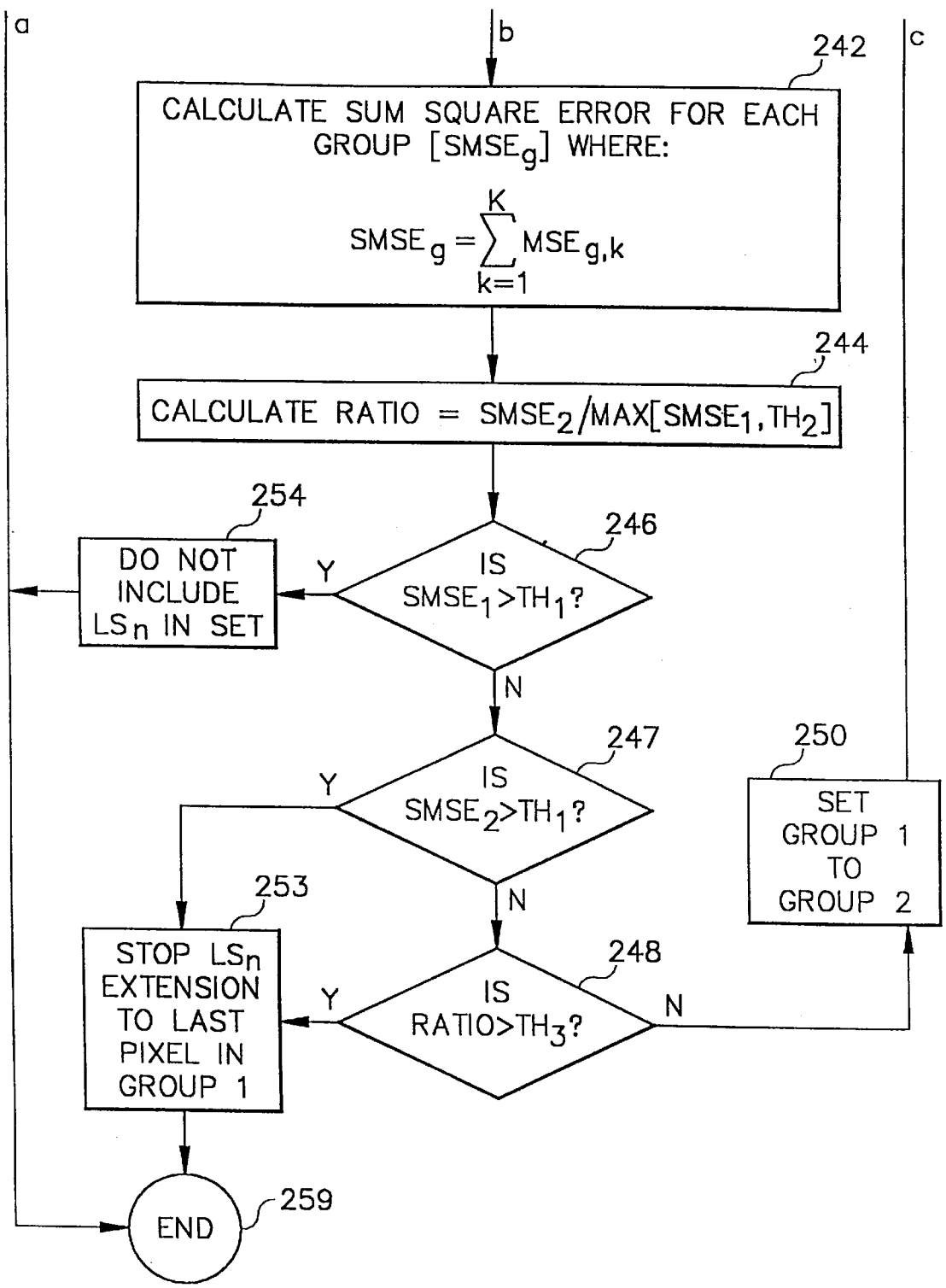
Figure 7:
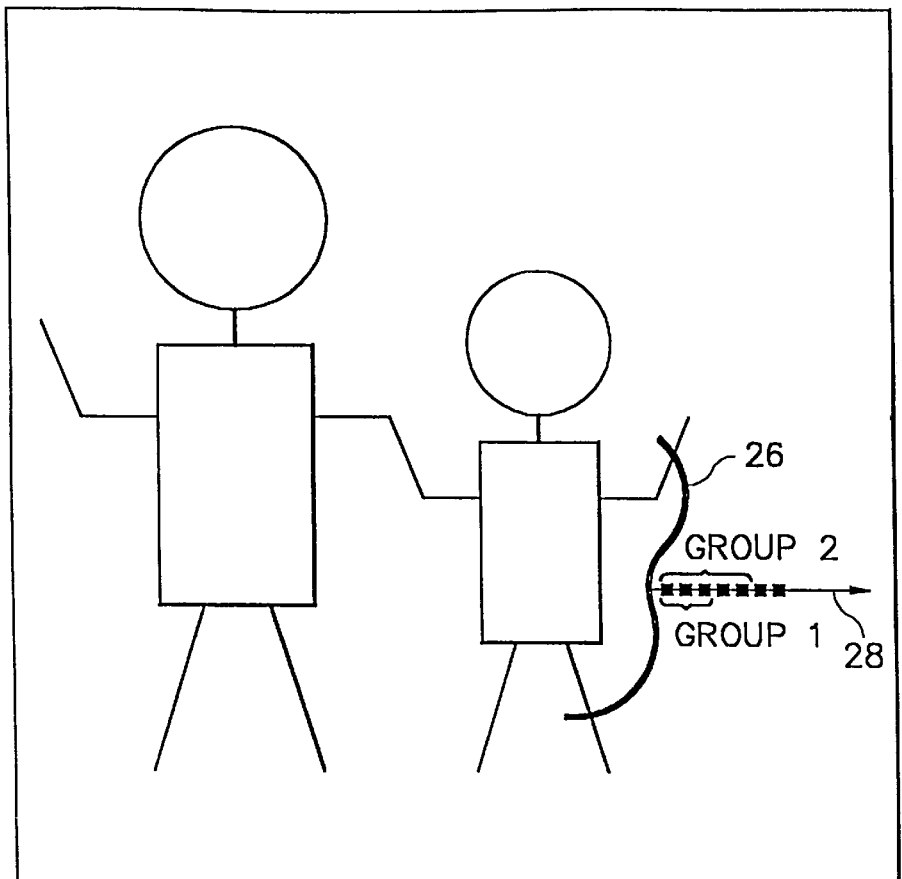
FIG. 7 is a pictorial view of the digital image of FIG. 2(a) illustrating a line segment being defined as described in FIGS. 6A and 6B.

Referring to FIGS. 6A, 6B and 7, the second alternative embodiment will now be discussed. FIGS. 6A and 6B are flow charts describing the extension of one side of line segment $LS_n$ from $PIXEL_{SEL}$. Starting at step 226, multiplier A is first set to 1 (step 228). Variable Q is then set to a desired initial number of non-defect pixels from $PIXEL_{SEL}$, and variable E to a desired increment number of non-defect pixels (step 230). Next, the first Q adjacent non-defect pixels for the line segment $LS_n$ extension from $PIXEL_{SEL}$ is set as Group 1 along a vector corresponding to line segment $LS_n$ radial line (step 232). A series of stopping conditions for extending line segment $LS_n$ are then checked. First, if Group 1 cannot be established either due to the lack of Q adjacent non-defect pixels or that the edge of the source image (or defect map) was reached, then path 262 from step 232 is followed to step 260 where line segment $LS_n$ is not included in SET. Next a check is performed to determine whether the number of pixels in Group 1 exceeds a maximum threshold of line segment non-defect pixels $TH_{max}$ (step 236). If so, then the "yes" branch is taken to step 257 where the line segment $LS_n$ extension stops at the pixel in Group 1 before $TH_{max}$ was exceeded. $TH_{max}$ represents the maximum number of non-defect pixels any one side of $PIXEL_{SEL}$ may be composed of.

If the number of pixels in Group 1 does not exceed $TH_{max}$, then the "no" branch is taken to step 238 where the first $Q+(A*E)$ adjacent non-defect pixels from $PIXEL_{SEL}$ along the same vector as Group 1 is set as Group 2. If Group 2 cannot be established either due to a lack of $Q+(A*E)$ adjacent non-defect pixels, or that the edge of the source image (or defect map) was reached, then path 263 is taken to step 261 where line segment $LS_n$ extension stops at the last pixel in Group 1. Q represents a base number of non-defect pixels in line segment $LS_n$, and E represents the number of successive non-defect pixels added to that base number in each iteration of the extension process, as will be shown below.

FIG. 7 illustrates an example of extending line segment $LS_n$ along a vector 28 from $PIXEL_{SEL}$ in defect region 26 of source image 25. The black dots along vector 28 in FIG. 7 represent adjacent non-defect pixels from $PIXEL_{SEL}$ (not drawn to scale). In this example, Q equals 3 and E equals 2. Thus, Group 1 comprises the first three adjacent non-defect pixels closest the $PIXEL_{SEL}$, and Group 2 comprises five non-defect pixels, i.e., the three non-defect pixels in Group 1 and the next two adjacent non-defect pixels from $PIXEL_{SEL}$ after the non-defect pixels of Group 1.

Next, a functional model is calculated for each channel k of the pixels in each group (step 239). Then, at step 240 a mean square fitting error ($MSE_{g,k}$) is calculated for each channel k of their non-defect pixels from their model, where g=1 and 2, representing Group 1 and Group 2 respectively. Functional model and MSE calculations were described earlier in reference to FIGS. 4A, 4B. Next, the MSE's for each channel of each group are summed to provide a sum mean square error value ($SMSE_g$) for each group g (step 242), where:

$$SMSE_g = \sum_{k=1}^{K} MSE_{g,k} \qquad (7)$$

In the preferred embodiment $SMSE_g$ is calculated only when necessary i.e. the $SMSE_2$ is stored as $SMSE_1$ for the next extension step.

Next, a RATIO is calculated for the sum mean square errors of Group 2 to Group 1, RATIO=$SMSE_2$/Max[$SMSE_1$, $TH_2$], where $TH_2$ is greater than 0 and the Max function selects the greater of the two terms $SMSE_1$, and $TH_2$ (step 244).

The next three checks are based upon $SMSE_1$, $SMSE_2$ and RATIO. The first check is performed only once at the beginning of the extension process when A=1. The first check is whether the sum mean square error calculated for Group 1, $SMSE_1$, is greater than a first threshold, $TH_1$ (step 246). If so, then the "yes" branch is taken to step 254 where line segment $LS_n$ is not included in SET. The second check is whether the sum mean square error of Group 2, $SMSE_2$, is greater than the first threshold, $TH_1$ (step 247). The third check is whether RATIO is greater than a third threshold, $TH_3$ (step 248). These three thresholds $TH_1$, $TH_2$, and $TH_3$ are empirically determined such that the more statistically consistent the values of the non-defect pixels are within each group to their model, the further line segment $LS_n$ will extend from $PIXEL_{SEL}$. Preferably, these thresholds are selected to provide that $TH_1$ is greater than $TH_2$, and $TH_3$ is greater than 1. If all three checks at steps 246, 247, and 248 are false, then their "no" branches are taken to step 250 where the Group 1 pixels are replaced with the pixels of Group 2. Then, A is indexed by one (step 251) and steps 236–248 are repeated as previously described, wherein Group 2 now includes the next E adjacent non-defect pixels from $PIXEL_{SEL}$ in addition to the pixels of Group 1. Using FIG. 7 as an example, Group 1 now has five non-defect pixels from $PIXEL_{SEL}$ and Group 2 has seven non-defect pixels from $PIXEL_{SEL}$ along vector 28. If either the second check (step 247) or third check (step 248) is true, then their "yes" branch is taken to step 253 where the line segment $LS_n$ extension stops at the last non-defect pixel furthest from $PIXEL_{SEL}$ in Group 1. Groups 1 and 2 will continue to be expanded in the above manner until at least one stopping condition is satisfied.

Once the extension of one side of line segment $LS_n$ from $PIXEL_{SEL}$ is completed, without an indication of non-inclusion in SET, the above process is repeated for the other side of line segment $LS_n$. In this manner, the total composition of defect and non-defect pixels for each side of line segment $LS_n$ is determined or fixed. The above is repeated for each line segment through $PIXEL_{SEL}$. Finally, the SET of line segments defined at step 202 comprises the line segments which are extended on both sides of $PIXEL_{SEL}$ without a non-inclusion indication.

Of the above two alternative embodiment, the second embodiment is preferred because it employs statistical analysis of non-defect pixel values (e.g., SMSE) in extending line segments, rather than a constant number of non-defect pixels ND. Further, in the second embodiment, those skilled in the art can appreciate other types of stopping conditions may also be used than those described to provide different line segment extension criteria.

Preferably in this apparatus, once non-defect pixels have been estimated and stored in the corrected image (steps 110 and 112 in FIG. 3), their estimated corrected values are not used in subsequent correction of other non-defect pixels in the source image. However, where after a single scan of the source image defect pixels remain uncorrected, corrected pixel values alternatively can be used in a second scan for correcting defect pixels. This may be required where the defect region is very large, or the defect region lies near the boundaries of the source image.

From the foregoing description, it will be apparent that there has been provided an improved method and apparatus for correcting pixel values in a digital image. Variations and modifications in the herein described system in accordance with the invention will undoubtedly suggest themselves to those skilled in the art. Accordingly, the foregoing description should be taken as illustrative and not in a limiting sense.

PARTS LIST

8 Apparatus
10 Computer system
12 Processor
14 Memory
16 Internal Bus
18 Hard disk
20 Image reader
22 User interface
24 Image output device
25 Source Image Example
26 Defect Example
27 Window Operator Example
28 Vector
98–261 Steps
262–263 Paths

What is claimed is:

1. A method for correcting one or more defect pixels in a source image with non-defect pixels and the defect pixels, each of the defect pixels and the non-defect pixels being represented by at least one defect pixel signal and non-defect pixel signal, respectively, said method comprising the steps of:

selecting one of said defect pixels;

allocating a plurality of line segments through said selected defect pixel, wherein each said line segment is composed of the defect pixels and the non-defect pixels about said selected defect pixel;

determining at least one representative model of the non-defect pixel signals along each said line segment;

determining the deviation of the non-defect pixel signals along each said line segment from the model corresponding to the line segment;

selecting the line segment having the lowest deviation; and determining corrected pixel signals for said selected defect pixel based on at least two of the non-defect pixel signals in said selected line segment.

2. A method according to claim 1 wherein one or more of said defect pixels are located within a defect region of said source image, and said step of selecting one of said defect pixels includes selecting one of said defect pixels in said defect region.

3. A method according to claim 1 wherein:

said defect pixel signals represent channel signals of their corresponding defect pixels;

said non-defect pixel signals represent channel signals of their corresponding non-defect pixels;

said model determining step further comprises determining a representative model based upon corresponding channel signals of the non-defect pixels along each said line segment; and said deviation determining step further comprises determining a deviation of corresponding channel signals of the non-defect pixels along each said line segment from the model of said channel signals of said non-defect pixels along the line segment.

4. A method according to claim 3 wherein:

said deviation determining step further comprises the step of determining a total for each said line segment based on the deviation of the channel signals of the non-defect pixels;

said line segment selecting step further comprises the step of selecting the line segment having the lowest total; and said pixel signals determining step further comprises determining corrected channel signals for said selected defect pixel based on the channel signals of at least two of said non-defect pixels in said selected line segment.

5. A method according to claim 1 further comprising the step of scanning successively the defect pixels and the non-defect pixels in said source image, and said defect pixel selecting step further comprises the step of selecting each said defect pixel in said source image during said successive scanning of said defect pixels in said source image.

6. A method according to claim 5 further comprising the step of storing in a corrected image the pixel signals of said non-defect pixels in said source image, and the corrected pixel signals for each said selected defect pixel.

7. A method according to claim 6 further comprising the step of outputting the pixel signals of said corrected image.

8. A method according to claim 1 wherein said allocating step is carried out to provide the line segments at equal radial angles about said selected defect pixel, each said line segment being composed of the defect pixels and the non-defect pixels in said source image near the respective radial angle of the line segment.

9. A method according to claim 1 wherein said allocating step further comprises the step of allocating each line segment through said selected defect pixel such that the defect pixels and the non-defect pixels in the source image composing said line segment are from opposite sides of said selected defect pixel.

10. A method according to claim 9 wherein said model determining step and said deviation determining step is performed only on line segments composed substantially of non-defect pixels on each said opposite side of said selected defect pixel.

11. A method according to claim 9 wherein said allocating step further comprises composing each said line segment of a predefined number of the non-defect pixels on each said opposite side of said selected defect pixel.

12. A method according to claim 9 wherein said allocating step further comprises the step of composing each said line segment of a variable number of the defect pixels and the non-defect pixels by extending the line segment along a vector from each said opposite side of said selected defect pixel, wherein said variable number for each said line segment is based upon statistical consistency of the non-defect pixel signals along the vector.

13. A method according to claim 12 wherein said composing step further comprises the step of determining said variable number of pixels for each said opposite side by placing said non-defect pixels for said side into groups of adjacent non-defect pixels, selecting a first one of said groups, and a second one of said groups, wherein said second group comprises the non-defect pixels in said first group and the group next furthest from said selected defect pixel which is adjacent to said first group, calculating a first sum mean square error of the signals of the non-defect pixels in said first group and a second sum mean square error of the signals of the non-defect pixels in said second group, calculating a ratio of said second sum mean square error to the greater of said first sum mean square error or a second threshold, and fixing said variable number to the number of the defect pixels and non-defect pixels from said selected pixel to said non-defect pixel in said first group furthest from said selected defect pixel when one of said second sum mean square error is greater than said first threshold, and said ratio is greater than a third threshold, wherein said first threshold is greater than said second threshold, and said third threshold is greater than one.

14. A method according to claim 13 wherein said step of determining said variable number of pixels for each said opposite side further comprises the steps of:

fixing said variable number to the number of the defect pixels and the non-defect pixels to the last non-defect pixel in said first group within said source image when one of said first and said second groups extends outside said source image; and fixing said variable number to the number of the defect pixels and the non-defect pixels to the last non-defect pixel in said first group when said non-defect pixels in said first group exceed a maximum threshold.

15. A method according to claim 9 wherein said corrected pixel signals determining step further comprises interpolating pixel signals for said selected defect pixel based on at least one of the non-defect pixel signals in said selected line segment from each said opposite side of said selected defect pixel.

16. A method according to claim 1 wherein said allocating step further comprises composing said line segments of the same total number of the defect pixels and non-defect pixels.

17. A method according to claim 1 wherein said deviation determining step further comprises the steps for each line segment of:

determining estimated signals for each non-defect pixel in the line segment based upon one of the models of the non-defect pixel signals of the line segment;

determining an error signal based upon the difference between the non-defect pixel signals and the estimated signals of each non-defect pixel in the line segment;

determining a square of each error signal; and determining a mean of the squared error signals to provide said deviation.

18. A method according to claim 1 wherein said step of determining the deviation of said pixel signals further comprises the step for each line segment of:

determining a standard deviation of the pixel signals of the non-defect pixels in the line segment, wherein said deviation of the line segment is said standard deviation.

19. An apparatus for correcting values of defect pixels in a source image having a programmed computer with memory for storing said source image, said stored source image comprising a plurality of pixels having signals representing values of one or more color channels, and a defect region comprising the pixels within said plurality having corrupted values, wherein said pixels in said defect region are defect pixels, and said pixels outside said defect region are non-defect pixels, said apparatus comprising:

means for selecting one of said defect pixels in said defect region;

means for allocating a plurality of line segments through said selected defect pixel, wherein each said line segment is composed of pixels in said source image about said selected defect pixel;

means for determining for each channel of each said line segment a representative model of the non-defect pixels values;

means for determining for each channel of each said line segment the deviation of the non-defect pixels values in said line segment from their representative model;

means for determining a total for each line segment based on said deviation for each channel of said line segment;

means for selecting the line segment having the lowest said total deviation from among said plurality of line segments; and means for determining a value for each channel of said selected defect pixel based on the values of at least two of said non-defect pixels in said selected line segment.

20. An apparatus according to claim 19 further comprising means for scanning successively each pixel in said source image, wherein said selecting means selects said defect pixel during said scanning when said scanned pixel is one of said defect pixels in said source image.

21. An apparatus according to claim 20 further comprising means for storing in said memory during said scanning by said scanning means of each pixel in said source image a corrected image having signals representing the value of each channel of said non-defect pixels in said source image, and the determined value for each channel of each said selected defect pixel.

22. An apparatus according to claim 21 further comprising an output device coupled to said computer, and means for outputting from said memory to said output device said signals representing the values of the pixels of said stored corrected image in said memory.

23. An apparatus for correcting one or more defect pixels in a source image with non-defect pixels and the defect pixels, each of the defect pixels and the non-defect pixels being represented by at least one defect pixel signal and non-defect pixel signal, respectively, said apparatus comprising:

means for selecting one of said defect pixels;

means for allocating a plurality of line segments through said selected defect pixel, wherein each said line segment is composed of the defect pixels and the non-defect pixels about said selected defect pixel;

means for determining at least one representative model of the non-defect pixel signals along each said line segment;

means for determining the deviation of the non-defect pixel signals along each said line segment from the model corresponding to the line segment;

means for selecting the line segment having the lowest deviation; and means for determining corrected pixel signals for said selected defect pixel based on at least two of the non-defect pixel signals in said selected line segment.

24. An apparatus for correcting values of defect pixels in a source image having a programmed computer with memory for storing said source image, said stored source image comprising a plurality of pixels having signals representing values of one or more color channels, and a defect region comprising the pixels within said plurality having corrupted values, wherein said pixels in said defect region are defect pixels, and said pixels outside said defect region are non-defect pixels, said apparatus further comprising said programmed computer having a processor wherein:

said processor selects one of said defect pixels in said defect region; allocates a plurality of line segments through said selected defect pixel wherein each said line segment is composed of pixels in said source image about said selected defect pixel, determines for each channel of each said line segment a representative model of the non-defect pixels values, determines for each channel of each said line segment the deviation of the non-defect pixels values in said line segment from their representative model, determines a total for each line segment based on said deviation for each channel of each line segment, selects the line segment having the lowest said total from among said plurality of line segments, and determines a value for each channel of said selected defect pixel based on the values of at least two of said non-defect pixels in said selected line segment.

25. An apparatus according to claim 24 further comprising:

An output device coupled to said processor; and said processor also scans successively each pixel in said source image, wherein said selection of said defect pixel occurs during one or more of said successive scans, stores in said memory a corrected image having signals representing the value of each channel of said non-defect pixels in said source image and the determined value for each channel of each said selected defect pixel, and outputs from said memory to said output device the signals representing values of the pixels of said corrected image.

* * * * *

UNITED STATES PATENT AND TRADEMARK OFFICE
CERTIFICATE OF CORRECTION

| | | |
|---|---|---|
| PATENT NO. | : 6,104,839 | Page 1 of 1 |
| APPLICATION NO. | : 08/675320 | |
| DATED | : August 15, 2000 | |
| INVENTOR(S) | : David Roy Cok, Robert Terry Gray and Thomasz Andrzej | |

It is certified that error appears in the above-identified patent and that said Letters Patent is hereby corrected as shown below:

ON THE TITLE PAGE

Insert the following after priority claim after item (22):

-- Related U.S. Application Data

(60)    Provisional application No. 60/006,525, filed on Oct. 16, 1995. --

Signed and Sealed this

Twenty-fourth Day of December, 2013

Margaret A. Focarino
*Commissioner for Patents of the United States Patent and Trademark Office*